United States Patent
Cato et al.

(10) Patent No.: US 6,556,216 B1
(45) Date of Patent: Apr. 29, 2003

(54) FISCAL PRINTER VIDEO WITH APPLICATION PROGRAM

(75) Inventors: Robert Thomas Cato, Raleigh, NC (US); Wayne Roger Hucaby, Raleigh, NC (US); Susan Ann Luerich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,837

(22) Filed: Mar. 13, 2000

(51) Int. Cl.[7] .................................................. G09G 5/04
(52) U.S. Cl. ........................ 345/629; 345/547; 348/600
(58) Field of Search ................................. 345/629, 536, 345/545, 547, 213, 214, 592, 716–723; 348/150, 151, 159, 505, 510, 589, 600; 358/1.1, 1.13, 1.16, 1.18

(56) References Cited

U.S. PATENT DOCUMENTS

| | | | |
|---|---|---|---|
| 4,337,482 A | * 6/1982 | Coutta | 348/159 |
| 4,580,165 A | * 4/1986 | Patton et al. | 348/510 |
| 4,846,694 A | 7/1989 | Erhardt | 434/365 |
| 4,899,276 A | 2/1990 | Stadler | 364/300 |
| 5,216,502 A | * 6/1993 | Katz | 348/150 |
| 5,309,558 A | 5/1994 | Rourke et al. | 395/166 |
| 5,461,716 A | 10/1995 | Eagen et al. | 395/157 |
| 5,715,382 A | * 2/1998 | Herregods et al. | 358/1.18 |
| 5,751,924 A | * 5/1998 | Hamada et al. | 358/1.16 |
| 5,802,259 A | * 9/1998 | Sugai | 358/1.13 |
| 5,883,610 A | * 3/1999 | Jeon | 345/629 |
| 2002/0022515 A1 | * 2/2002 | Boku et al. | 463/36 |

FOREIGN PATENT DOCUMENTS

JP          07-223347          8/1995

* cited by examiner

Primary Examiner—Matthew Luu
Assistant Examiner—Thu-Thao Havan
(74) Attorney, Agent, or Firm—J. Bruce Schelkopf

(57) ABSTRACT

The present invention discloses a method and system for controlling a system display from the processor controlling a fiscal printer. The system display is controlled by generating an overlay image in a storage device along with overlay image selector data. The overlay image selector data is used to control modifying circuits that can substitute or otherwise modify, with overlay image data, all or a portion of the system display image generated by application software. Since the fiscal printer hardware and firmware is not a part of the particular application software running on a point of sale device the control function of the fiscal printer need not require modification of application software or hardware.

17 Claims, 4 Drawing Sheets

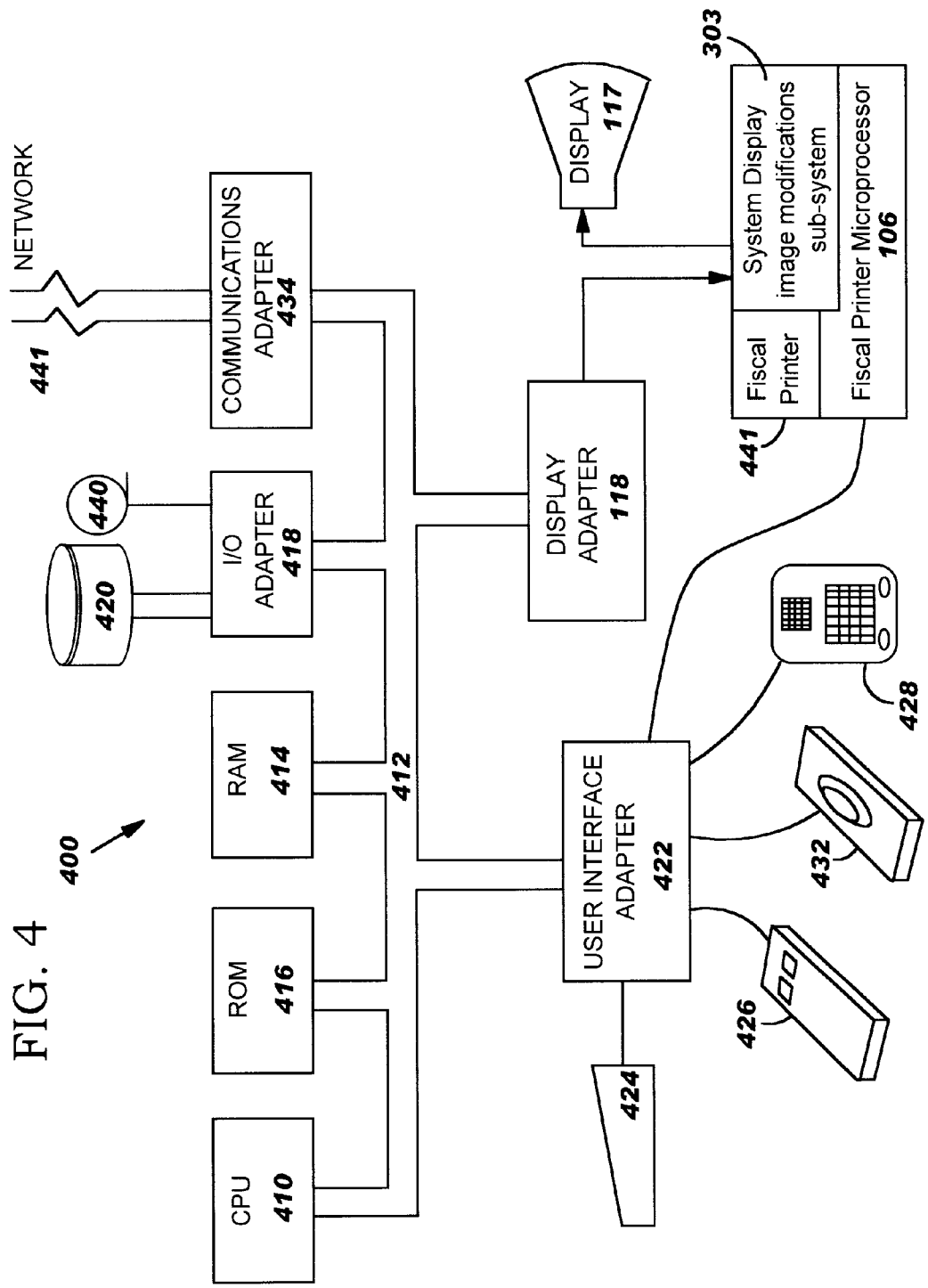

FISCAL PRINTER VIDEO WITH APPLICATION PROGRAM

TECHNICAL FIELD

The present invention relates in general to data processing systems, and in particular, to displaying image data generated by a fiscal printer used in retail, point of sale operations.

BACKGROUND INFORMATION

In certain countries, point-of-sale terminal (cash register) printers must have additional hardware that collects and stores that cash register's sales totals data for reporting tax collection to the government. These printers are known as "fiscal printers". The additional hardware in the fiscal printer that collects and stores these totals is tamper-evident, which is accepted by these governments as "secure". This secure hardware controls print requests to the customer receipt print station from the terminal's application program, and it also generates printing itself, based on certain circumstances. All printing on customer receipts is also either printed on a separate "journal" paper roll, or stored electronically inside the secure hardware.

Some countries are considering requiring the fiscal printer to control the point of sale (POS) system's display. The disclosed invention allows the fiscal printer to control some or all of the video display of the POS system with an application program controlling that portion of the system display that is unused. The advent of the all digital display protocols, in particular, would allow one to easily modify the data going to an LCD display to alter a displayed image. In the event that governments require the fiscal printer to control the displayed information on a system display, a method is needed to continue to have an application program display its data while allowing the fiscal printer to modify and display additional information. The present invention discloses a method of changing the interface between a system display controller and a system display so the displayed information may be altered.

SUMMARY OF THE INVENTION

The present invention discloses a method and system for having a fiscal printer enabled to control the information displayed on a point of sale (POS) video display. The fiscal printer firmware is modified and additional circuits are added that allow the fiscal printer to load into a memory the image it wants to add to the image displayed by an application program. An overlay controller receives the video controls that provide the signals that determine the start of a scan, how many pixels are in a line and the number of lines. The fiscal printer firmware stores one or more bits of fiscal printer image data in each mapping address of possible pixels of display data. The overlay controller reads the pattern of stored data concurrent with receiving the stored application image. When stored data indicates, application image information going to the system display is modified by the corresponding data stored in the overlay memory device. Different modifications are possible, the data going to the POS display could be color modified, substituted by data stored in the overlay memory device, or changed in other ways determined by the stored data and the code in the fiscal printer microprocessor.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a block diagram illustrating embodiments of the present invention;

DETAILED DESCRIPTION

Figure 1:
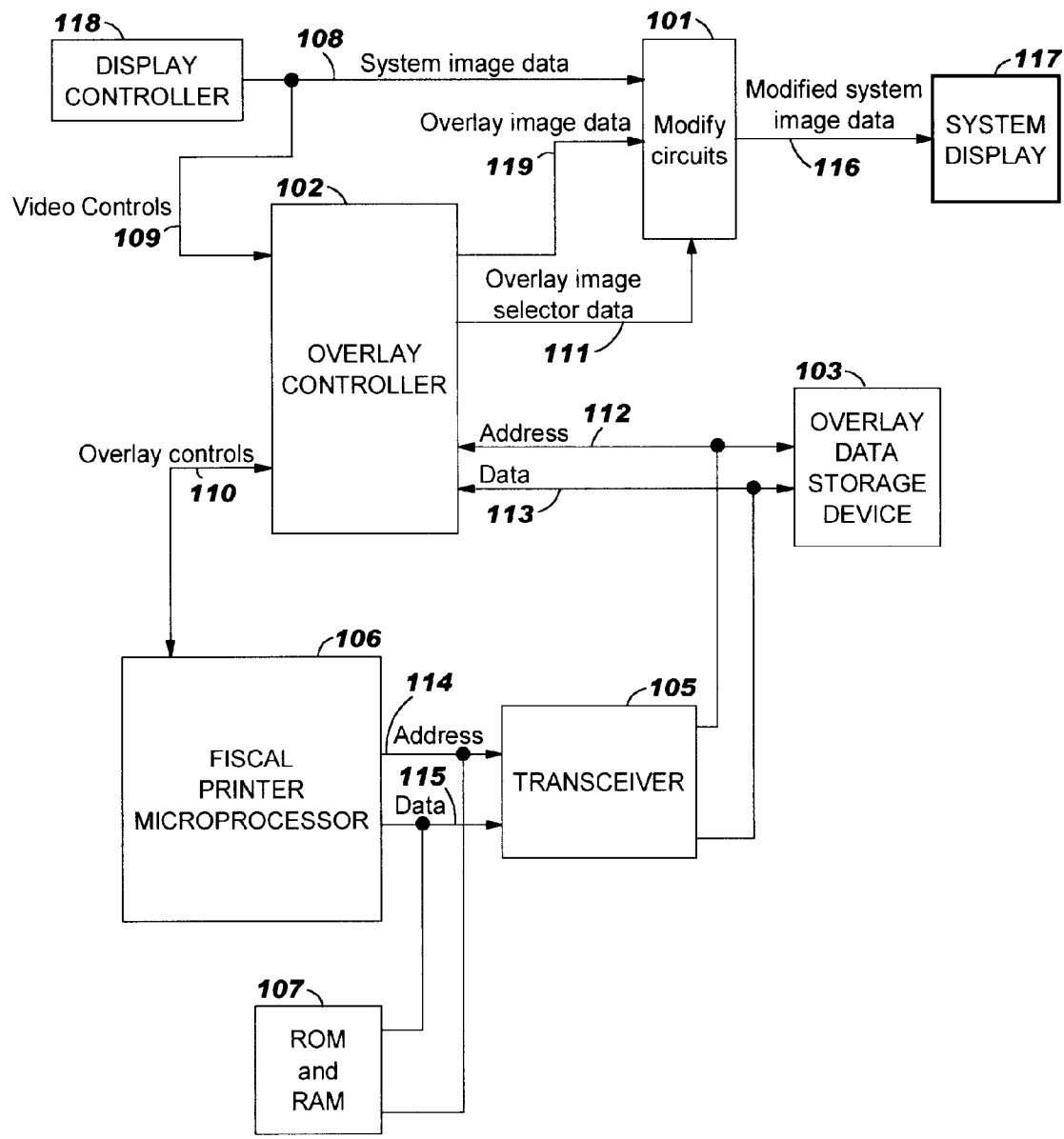
FIG. 1 is a block diagram illustrating one embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a block diagram illustration of one embodiment of the present invention. System image data and control 108 from a display controller 118 is normally routed to a system display 117. System image data and control 108 typically comprises video data for each pixel of an image and synchronizing signals that determine how a video frame is constructed for displaying the image. The number of pixels grouped together to make a complete graphic or image may be referred to as a video frame. The video frames are typically sent to a display at a frame rate that allows a viewer to see a "flicker" free image. "Pixel" is short for "picture element" and a pixel is a single point in a graphic image. Graphics monitors display pictures by dividing the display screen into thousands (or millions) of pixels, arranged in rows and columns. The pixels are so close together that they appear connected. The number of bits used to represent the video content of each pixel determines how many colors or shades of gray can be displayed. For example, in eight bit mode, the monitor uses eight bits for each pixel, making it possible to display 256 shades of gray. In a color monitor, eight bits are used for each red, green, and blue sub-pixel, making it possible to display 16.7 million colors. The video content of a pixel may be referred to as pixel video data.

In one embodiment of the present invention, a modifying circuit 101 is inserted between the display controller 118 and the system display 117. An overlay controller 102 receives video controls 109 which are normally routed as part of system image 108 to the system display 117 for synchronizing data written to the system display 117. The system image data 108 may undergo delay equalization in modify circuit 101. Other embodiments of the present invention may route the system data through the overlay controller (routing not shown) for delay equalization.

Typical synchronizing signals in video controls 109 comprise a start scan pulse that indicates when data is being transmitted for a new display frame, a sync signal with a pulse at each pixel position along a horizontal line and a horizontal line pulse indicating the start of each line of the scan. By using these signals an address can be generated for each pixel of a displayed frame of video data. A frame of video data includes data that defines pixels of the image (color or gray scale information) and where a particular pixel is located on the frame. Typically the addresses that were used to store and retrieve pixel video data of an image are lost as a video frame is generated. To synchronize a frame of video data from a display controller with a frame of overlay image data, addresses used to access pixel video data of the overlay image would need to be reconstructed from the frame data sent to a system display. Depending on the type of display used in a particular POS system, the video frame data format may be different and addressing methods may vary. For example, a Liquid Crystal Display (LCD) may have a different data format than a Cathode Ray Tube display (CRT). Other displays using light emitting diodes (LEDs), plasma, or other technologies may have consistent interface formats. All display interface methods including the all digital Transition Minimized Differential Signaling (TMDS) protocol used in transmitting images to LCDs are applicable to embodiments of the present invention.

Fiscal printer microprocessor 106 would use an addressing method to store an overlay image (not shown in FIG. 1) in overlay storage device 103. When a frame of video data is sent by a display controller 118, the video control signals 109 would signal overlay controller 102 to generate synchronous addresses and read out pixel video data of an overlay image (not shown in FIG. 1) stored in overlay storage device 103. Each pixel of a frame of video data, from a display controller 118, would have a corresponding pixel of overlay video data 119 retrieved from an overlay storage device 103 by overlay controller 102. The synchronized readout of an overlay image using the video control signals 109 would allow overlay modification of frames of displayed video information. Since the pixel video data for an overlay image is synchronously retrieved using video control data 109, offset data may be used as a method of moving an overlay image with respect to a given system displayed image. Other techniques may be used to determine when to use overlay image data to modify a video image from a display controller 118 without departing from the scope of the present invention.

The modify circuit 101 function can be controlled by overlay type selector 111 to establish such things as; the color of an overlay, if an overlay pixel is a complement of a system image pixel color, an overlay pixel background color, if overlay background is multi-colored, or if the overlay is displayed at all.

Fiscal printer microprocessor 106 stores overlay images in overlay storage device 103 using addresses 114 and data 115 via transceiver 105, likewise, overlay controller 102 reads overlay images as data 113 using addresses 112. Overlay controls 110 may be used by fiscal printer microprocessor 106 to communicate with overlay controller 102. Addresses 114 and data 115 may also be used by printer microprocessor 106 to direct operations of overlay controller 102. Read Only Memory (ROM) and Random Access Memory (RAM) 107 is memory used by microprocessor 106 and may contain data and firmware instructions.

Figure 2:
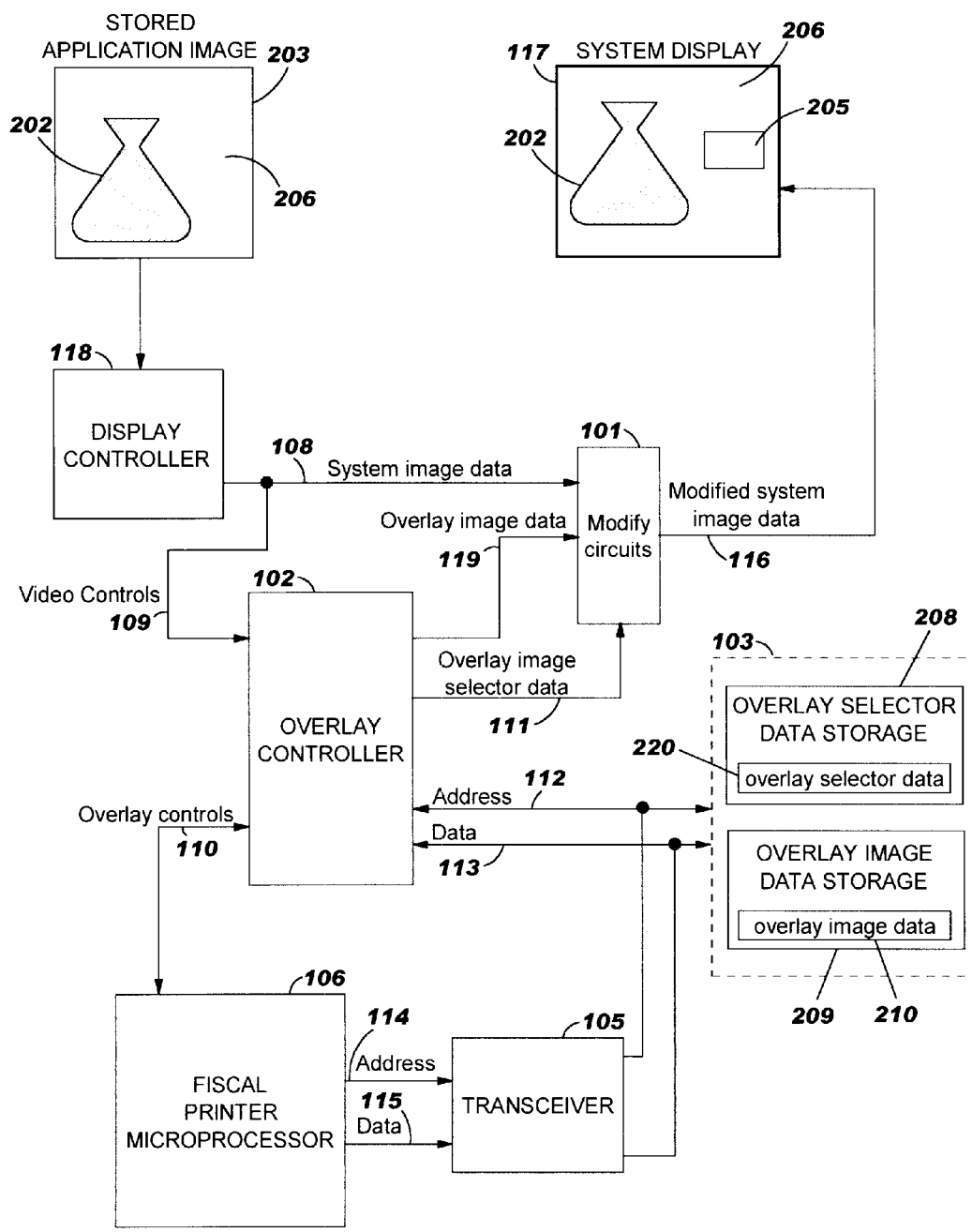
FIG. 2 is a block diagram illustrating another embodiment of the present invention.

FIG. 2 illustrates operation of one embodiment of the present invention. In the embodiment in FIG. 2 a single color shape or image 205 is an overlay to the application image 203 comprising image element 202 with background 206. A storage device (not shown) may be used to store video pixel data describing the application image 203. Display controller 118 would read and send the application image 203 as system image data 108 to system display 117 via modifying circuit 101. System image data 108 would include the image data itself and any necessary video controls 109. Modified system display data 116 is either the system image data 108 or video data modified by modify circuit 101 to include overlay image data 119, depending on overlay selector data 111. The data used to define the image displayed as overlay image 205 is stored in an overlay storage device 103 which contains overlay selector data storage 208 and overlay image data storage 209. Overlay selector data 208 contains overlay selector data 220. Overlay image data storage 209 contains overlay image data comprising an overlay image 301 and an overlay background 302 (see FIG. 3). In the general case, overlay selector data 208 could be an array of ones and zeroes corresponding to each possible pixel indicating whether to modify the system data 108 or to pass the system image data 108 unmodified. The overlay data storage device 103 could be a memory device with a memory word comprising a bit for overlay selector data 220 and the remaining bits defining the data to be substituted for the system image data 108.

In one embodiment of the present invention single color pixels are inserted in place of the application image 203 pixels defined by overlay selector data 220. The overlay selector data 220, in this example, would be simply a one or zero sent via overlay selector data link 111 by overlay controller 102 as it reads out overlay selector data storage 208. Data representing the single color would be read from overlay image data 210 and would be sent via overlay image data link 119 to modify circuit 101 along with overlay selector data 220 indicating whether to substitute pixels of single color data for pixels of the application image. As system image data 108 is sent by display controller 118, corresponding pixel addresses generated by overlay controller 102 are used to read out overlay selector data 220 stored in overlay selector data storage 208. In this example, a one for example, would be stored as overlay selector data 220 in those pixel addresses where overlay image data 210 is to be substituted and a zero when system image data is to pass unmodified. Fiscal printer 106 may update the overlay selector data 220 and the overlay image data 210 by writing to overlay image storage device 103 via transceiver 105.

In another embodiment of the present invention, modify circuit 101 may have circuitry to complement the system image data 108 at selected pixels to create a displayed overlay image. In this embodiment the overlay image data 210 is not needed, essentially eliminating the need for separate overlay image data link 119 and overlay image data storage 209. Complementing the system image data 108 at selected pixels guarantees that a desired overlay image would not be the same color or shade as the system image. In this embodiment, other logic operations on the system image data are possible as a simple way of creating a displayed overlay image.

Other embodiments of the present invention, where it is desired to create overlay images of more than a single color, would require an increasing number of bits for the overlay image data 210. For example, it would be possible to create up to a four color overlay image with two bits of image overlay data 210. A single bit of overlay selector data 220 may be used to define when to select and substitute a given image overlay data pixel color for an application image pixel.

Another embodiment of the present invention may create overlay images of more than a single color by controlling the pixel color with the overlay image selector data 220. Multiple bits of overlay selector data 220 may be used for each application image pixel. If the overlay selector data 220 for an application image pixel was non-zero, a pixel of a preselected color may be substituted for the application image pixel. For example, it is possible to create a two or three color overlay image with two bits of overlay selector data 220 per application image pixel. In this case, separate overlay image data storage 209 units may not be needed.

In one embodiment of the present invention there would be a one to one correspondence between the addresses of the overlay data storage device 103 and the pixels of the system image data 108. An overlay storage device 103 could, for example, store nine bits of data at each pixel address. One bit would be used for overlay selector data (substitute or not) and the remaining eight bits could be used to define up to 256 shades of gray.

Figure 3:
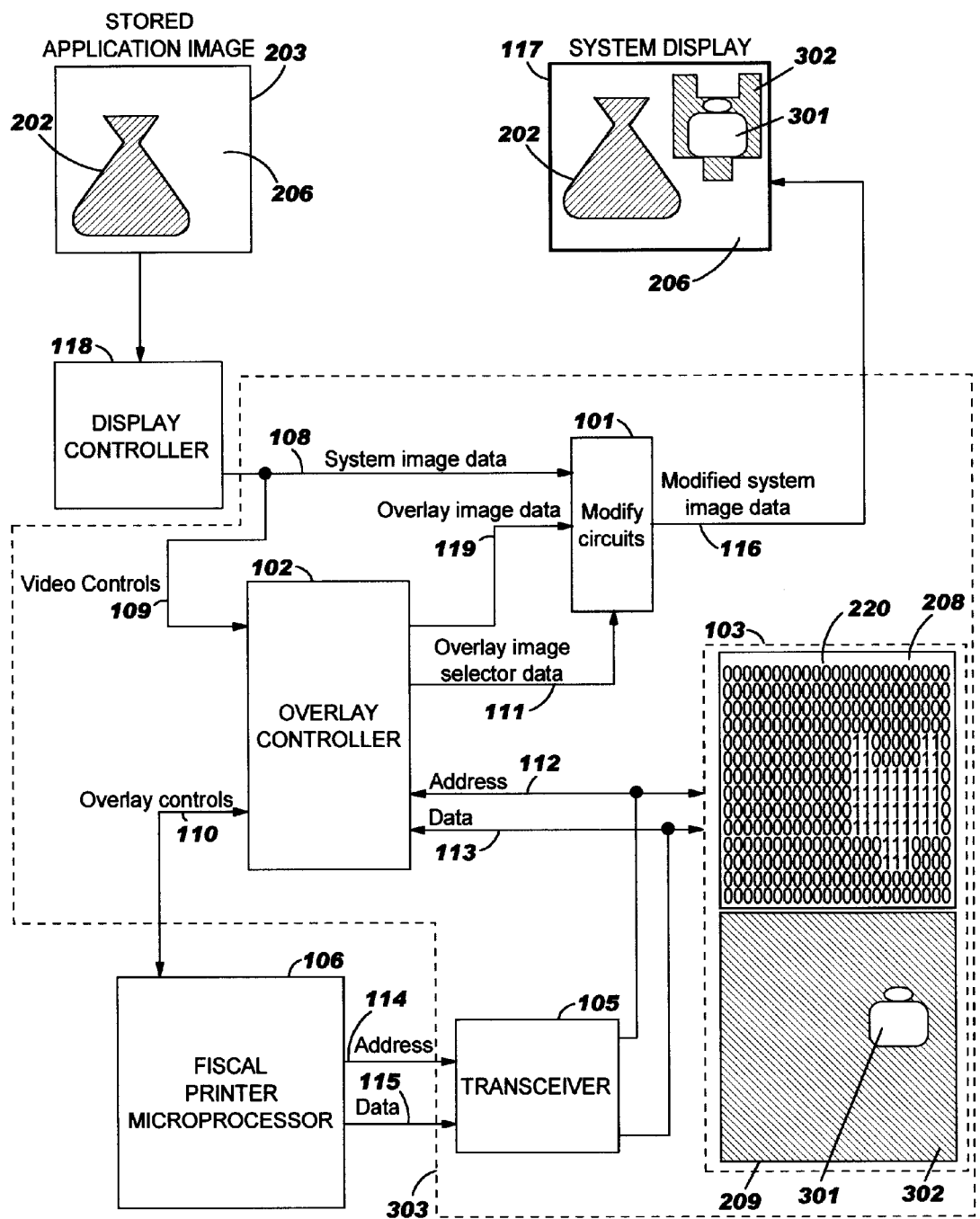
FIG. 3 is a block diagram illustrating another embodiment of the present invention.

FIG. 3 illustrates the embodiment of the present invention where a more complex overlay image is desired. In this example overlay image data 210 consists of an overlay image comprising an overlay image element 301 and an overlay background element 302 (cross hatched area). In FIG. 3, they are illustrated graphically rather than using a data representation Correspondingly, an array 220 of ones and zeroes represent overlay selector data. When the overlay selector data 220 is read, zeroes represent which pixels the system image data 108 will pass unmodified and a one represents the pixel data that will be substituted for application image 203 pixel data. In this illustrative example, the pattern of ones in the overlay selector data 220 represents the parts of the overlay image element 301 and overlay background element 302 that appear on the system display 117 as image element 301 and the background segment 302. Representing an overlay image as an image element 301 and a background element 302 is for convenience and for those cases when one wants to have the flexibility of manipulating the data representing a background separate from the data representing the shape of an image element. FIG. 3 illustrates a case where four distinct image elements, application image 202 (left hatched area), application background 206 (white), overlay image 301 (outlined shape) and its background 302 (right hatched area) are combined together using embodiments of the present invention and displayed on system display 117. Even though background 206 may not be defined as separate data for stored application image 203, it is separated in the illustration of FIG. 3. Some applications manipulate an image outline and its fill color or shade separate from the fill color or shade of a background outside of outlined images. FIG. 3 illustrates in dotted line area the elements contained in system display image modification sub-system 303.

The system display modification sub-system 303 is contained within the fiscal printer 441 shown in FIG. 4. The fiscal printer system 441 is a secure system that has hardware and software to control information that is displayed on the system display. The fiscal printer system control is independent of any application program that is run on the system on which the fiscal printer is coupled via the system input and output (I/O) bus and display adapter. The fiscal printer is a special device that has secure hardware to insure integrity of data used to determine retail sales data. Data displayed on a fiscal printer system is also presented to customers and as such could be used in a fraudulent manner. The present invention places control of the display used to present data to customers under the control of the fiscal printer system and independent of any application program running on the system using the fiscal printer system.

Referring to FIG. 4, an example is shown of a data processing system 400 which may be used for the invention. The system has a central processing unit (CPU) 410, which is coupled to various other components by system bus 412. Read-Only Memory ("ROM") 416 is coupled to the system bus 412 and includes a basic input/output system ("BIOS") that controls certain basic functions of the data processing system 400. Random Access Memory ("RAM") 414. I/O adapter 418, and communications adapter 434 are also coupled to the system bus 412. I/O adapter 418 may be a Small Computer System Interface ("SCSI") adapter that communicates with a disk storage device 420. Communications adapter 434 interconnects bus 412 with an outside network enabling the data processing system to communicate with other such systems. Input/Output devices are also connected to system bus 412 via user interface adapter 422 and display adapter 118. Keyboard 424, track ball 432, mouse 426, speaker 428 and fiscal printer 441 are all interconnected to bus 412 via user interface adapter 422. Display 117 is connected to system bus 412 by system image modification sub-system 303 inside fiscal printer and display adapter 118. In this manner, a user is capable of inputting to the system through the keyboard 424, trackball 432, or mouse 426, and receiving output from the system via speaker 428, display 117, and fiscal printer 441.

In a retail operation environment, the data processing system of FIG. 4 may include additional devices such as a fiscal printer system 441 containing a fiscal printer microprocessor 106 and system image modification sub-system 303 including modifying circuits of the present invention. System image modification sub-system 303 would also comprise an overlay controller for retrieving, storing and sending overlay images to display 117.

Although the present invention and its advantages have been described in detail, it should be understood that various changes, substitutions and alterations can be made herein without departing from the spirit and scope of the invention as defined by the appended claims.

What is claimed is:

1. A system for controlling a display on an input and output device, comprising:

a storage device for storing overlay image data;

an overlay image controller coupled to said storage device, a display controller, and a processor controlling said device, said overlay image controller operable for receiving control signals from said display controller and generating addresses for reading out said overlay image data from said storage device;

modifying circuits coupled to said display controller, said overlay image controller and a display, said modifying circuits operable for receiving system image display data, said overlay image data, overlay image selector data and modifying said system image display data in response to said overlay image data and said overlay image selector data; and display circuits operable for receiving said modified system image data and driving a display device for displaying a modified system image determined by said modified system image data.

2. The system of claim 1, wherein said display is a display on a point of sale cash register device.

3. The system of claim 1, wherein said modifying circuits comprises a multiplexer.

4. The system of claim 1, wherein said modifying circuit comprises logic circuits operable to perform logic operations on pixels of said system image data in response to said overlay image selector data or said overlay image data.

5. The system of claim 3, wherein said multiplexer is coupled to said display controller, said overlay image controller and said display, said multiplexer controlled by said selector data.

6. The system of claim 1 wherein said input and output device is a fiscal printer.

7. The system of claim 1, wherein said system image data and said overlay image data are digital formatted in Transition Minimized Differential Signaling (TDMS) protocol.

8. The system of claim 1, wherein said system image data is analog using a television video signal or a computer monitor Cathode Ray Tube (CRT) format and said display is an analog format display.

9. The system of claim 1, wherein said overlay image data is received from a host computer external to a host computer operating said fiscal printer.

10. A data processing system, comprising:
- a central processing unit (CPU);
- shared Random Access Memory (RAM);
- Read Only Memory (ROM);
- an I/O adapter;
- a fiscal printer system;
- a display adapter;
- a display;
- a user interface adapter; and
- a bus system coupling said CPU to said ROM, said RAM, said display adapter, said I/O adapter, said user interface adapter, said fiscal printer system coupled to said user interface adapter and said display adapter; wherein said fiscal printer system further comprises:
  - a storage device for storing overlay image data;
  - an overlay image controller coupled to said storage device, a display controller, and a processor controlling said fiscal printer, said overlay image controller operable for receiving control signals from said display controller and generating addresses for reading out said overlay image data from said storage device;
  - modifying circuits coupled to said display controller, said overlay image controller and a display, said modifying circuits operable for receiving system image display data, said overlay image data, overlay image selector data and modifying said system image display data in response to said overlay image data and said overlay image selector data; and
  - display circuits operable for receiving said modified system image data and driving a display device for displaying a modified system image determined by said modified system image data.

11. The data processing system of claim 10, wherein said display is a display on a point of sale cash register device.

12. The data processing system of claim 10, wherein said modifying circuits comprises a multiplexer.

13. The data processing system of claim 10, wherein said modifying circuit comprises logic circuits operable to perform logic operations on pixels of said system image data in response to said overlay image selector data or said overlay image data.

14. The data processing system of claim 12, wherein said multiplexer is coupled to said display controller, said overlay image controller and said display, said multiplexer controlled by said overlay image selector data.

15. The data processing system of claim 10, wherein said overlay image data is received from an external host computer.

16. The data processing system of claim 10, wherein said system image data and said overlay image data are digital formatted in Transition Minimized Differential Signaling (TDMS) protocol.

17. The data processing system of claim 10, wherein said system image data is analog using a television video signal or a computer monitor Cathode Ray Tube (CRT) format and said display is an analog format display.

* * * * *